(12) United States Patent
Schreyer et al.

(10) Patent No.: US 8,289,333 B2
(45) Date of Patent: Oct. 16, 2012

(54) MULTI-CONTEXT GRAPHICS PROCESSING

(75) Inventors: Richard Schreyer, Cupertino, CA (US);
Michael James Elliott Swift, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 732 days.

(21) Appl. No.: 12/397,330

(22) Filed: Mar. 3, 2009

(65) Prior Publication Data

US 2009/0225089 A1    Sep. 10, 2009

Related U.S. Application Data (60) Provisional application No. 61/033,751, filed on Mar. 4, 2008.

(51) Int. Cl.
| | |
|---|---|
| G06T 1/20 | (2006.01) |
| G06F 15/16 | (2006.01) |
| G06F 1/20 | (2006.01) |

(52) U.S. Cl. .................. 345/506; 345/502; 345/505
(58) Field of Classification Search .................. None
See application file for complete search history.

(56) References Cited

U.S. PATENT DOCUMENTS

| | | | |
|---|---|---|---|
| 6,300,947 B1 | 10/2001 | Kanevsky | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,697,063 B1 * | 2/2004 | Zhu | 345/421 |
| 6,820,133 B1 | 11/2004 | Grove et al. | |
| 6,888,536 B2 | 5/2005 | Westerman et al. | |
| 7,065,707 B2 | 6/2006 | Chen et al. | |
| 7,197,702 B2 | 3/2007 | Niyogi et al. | |
| 7,272,787 B2 | 9/2007 | Nakamura et al. | |
| 7,362,311 B2 | 4/2008 | Filner et al. | |
| 7,383,412 B1 * | 6/2008 | Diard | 711/170 |
| 7,412,644 B2 | 8/2008 | Kieffer | |
| 7,417,645 B2 | 8/2008 | Beda et al. | |
| 7,499,051 B1 | 3/2009 | O'Donnell | |
| 7,627,723 B1 * | 12/2009 | Buck et al. | 711/155 |
| 2002/0057446 A1 * | 5/2002 | Long et al. | 358/1.13 |
| 2002/0078115 A1 | 6/2002 | Poff et al. | |
| 2003/0023755 A1 | 1/2003 | Harris et al. | |
| 2003/0237053 A1 | 12/2003 | Chen et al. | |
| 2004/0012627 A1 | 1/2004 | Zakharia et al. | |

(Continued)

FOREIGN PATENT DOCUMENTS

EP    1351477 A1    10/2003

(Continued)

OTHER PUBLICATIONS

Elina Vartiainen, Virpi Roto, Janne Kaasalainen, "Graphical History List with Multi-Window Support on a Mobile Web Browser", IEEE, 2008, pp. 121-129, Finland.

(Continued)

*Primary Examiner* — Hau Nguyen
*Assistant Examiner* — Leon T Cain, II
(74) *Attorney, Agent, or Firm* — Blakely, Sokoloff, Taylor & Zafman LLP (57) ABSTRACT

A method of managing multiple contexts for a single mode display includes receiving a plurality of tasks from one or more applications and determining respective contexts for each task, each context having a range of memory addresses. The method also includes selecting one context for output to the single mode display and loading the selected context into a graphics processor for the display.

21 Claims, 9 Drawing Sheets

U.S. PATENT DOCUMENTS

| | | |
|---|---|---|
| 2004/0221004 A1 | 11/2004 | Chalfin et al. |
| 2005/0012751 A1 | 1/2005 | Karlov |
| 2005/0088446 A1 | 4/2005 | Herrick et al. |
| 2005/0154982 A1 | 7/2005 | Berg |
| 2007/0113179 A1 | 5/2007 | Gibbs et al. |
| 2007/0153004 A1 | 7/2007 | Airey et al. |
| 2007/0192818 A1 | 8/2007 | Bourges-Sevenier et al. |
| 2007/0288841 A1 | 12/2007 | Rohrabaugh et al. |
| 2007/0294646 A1 | 12/2007 | Timmons |
| 2008/0034292 A1 | 2/2008 | Brunner et al. |
| 2008/0074432 A1 | 3/2008 | Sun et al. |
| 2008/0082907 A1 | 4/2008 | Sorotokin et al. |
| 2008/0120626 A1 | 5/2008 | Graffagnino et al. |
| 2008/0136827 A1 | 6/2008 | Bakalash et al. |
| 2008/0148144 A1 | 6/2008 | Tatsumi |
| 2008/0165199 A1* | 7/2008 | Wei et al. .................. 345/506 |
| 2009/0150654 A1* | 6/2009 | Oberman et al. ............ 712/221 |
| 2009/0199219 A1* | 8/2009 | Rofougaran et al. ......... 719/330 |
| 2009/0225093 A1 | 9/2009 | Harper et al. |
| 2011/0169841 A1 | 7/2011 | Bakalash et al. |

FOREIGN PATENT DOCUMENTS

| | | |
|---|---|---|
| EP | 1 450 257 A2 | 8/2004 |
| EP | 1 450 257 A3 | 8/2004 |
| WO | WO 2008/019222 A1 | 2/2008 |

OTHER PUBLICATIONS

PCT Search Report and Written Opinion for PCT/US2009/001426 mailed Aug. 4, 2009, 12 pages.

PCT Search Report and Written Opinion for PCT/US2009/001414 mailed Jul. 2, 2009, 16 pages.

Ribble, Maurice, "Next-Gen Tile-Based GPUs," GameDevelopers Conference Mobile 08, San Francisco, Feb. 18-22, 2008, XP007908783, http://ati.amd.com/developer/gdc/2008/gdc2008_ribble_maurice_TileBasedGpus.pdf, pp. 1-36.

Akenine-Mökker T., et al., "Real-Time Rendering, Graphics Hardware, Case Study: KYRO," Real-Time Rendering, Natick, Mass., Jan. 1, 2002, XP002517007, pp. 705-708.

PCT Search Report and Written Opinion for PCT/US2009/001416 mailed Jun. 30, 2009, 12 pages.

\* cited by examiner

MULTI-CONTEXT GRAPHICS PROCESSING

This application claims priority to U.S. Provisional Application No. 61/033,751 filed on Mar. 4, 2008, which provisional application is incorporated herein by reference in its entirety.

DESCRIPTION OF THE RELATED TECHNOLOGY

Many types of media devices currently exist for presenting media content to a user. For example, televisions, radios, computers, and a variety of portable or handheld devices are available for presenting various types of audio and/or visual information to a user. Some examples of portable devices include music players (e.g., MP3 players), cell phones, smart phones, personal digital assistants (PDAs), portable televisions, laptops, and the like.

In presenting media to a user, media devices generally attempt to display graphics and/or video content generated from multiple applications running within the media device. Some media devices display multiple types of content at once by layering one type of content over another. For example, a user interface layer might include a status bar that is displayed at the same time as a video layer is displayed. The process of generating a combination of multiple layers for display can be referred to as compositing. However, multiple applications attempting to simultaneously access the limited graphics processing power and graphics memory of such media devices can cause them to slow down, or even fail.

Furthermore, some media devices implement multi-pipeline processing to allow multiple processes to execute in parallel. However, limited graphics processing resources can make such pipeline processing difficult to efficiently achieve.

DETAILED DESCRIPTION

Multi-context graphics processing can improve performance in some media devices by allowing multiple software programs to use the graphics hardware. When multi-context graphics processing is not provided an application may fail if another application has already begun to use the available graphics resources.

When a media device runs one task that always uses the graphics hardware (such as a Window Server), multi-context graphics processing allows other tasks to access and use the graphics hardware, as well. A multi-context processing module can be implemented to manage graphics processing requests, and to control inflow of processing requests to a graphics system.

In addition, the graphics system can be configured to process commands in multi-stage manner. For example, the graphics system can be configured for two-stage pipeline processing, such that a first processing operation is performed during a first stage, and a second processing operation is performed on the output of the first processing operation during a second stage. In some media devices configured for two-stage pipeline processing, the graphics processor can perform tiling operations during a first stage, and rendering operations during a second stage. Both stages may operate at the same time, on different sets of drawing commands. However, the graphics system's performance and reliability can suffer due to limited memory resources.

To address this performance inefficiency, if the memory resources required by one pipeline operation are much lower than the resources required by the other pipeline operation, the memory requirements of the first operation can be collapsed among multiple contexts to access the same, shared portion of memory. By sharing the same portion of memory, resources can be preserved, and overall performance enhanced.

In one embodiment, graphics hardware is configured to process graphics commands using such a multi-stage (e.g., two-stage) pipeline. However, in some cases, the graphics hardware is configured to only access on single page table at a time. By configuring each page table (for example, as stored in the graphics memory), to have a common region dedicated to processing one of the two pipeline stage processes, the efficiencies of a two-stage pipeline may be achieved, and overall system performance may be significantly enhanced.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the invention and not to limit the scope of the inventions disclosed herein.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined into a single block or state. Moreover, the various modules of the systems described herein can be implemented as software applications, modules, or components on one or more computers, such as servers. While the various modules are illustrated separately, they may share some or all of the same underlying logic or code.

Figure 1:
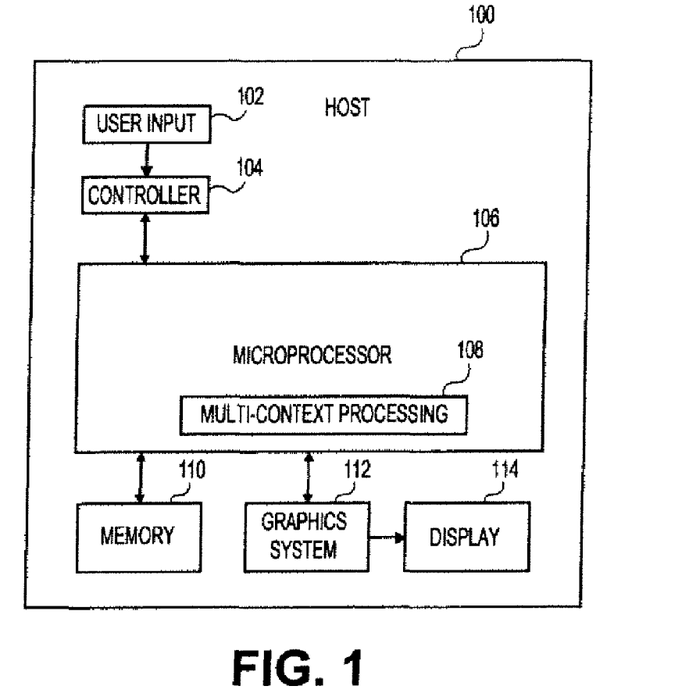
FIG. 1 is a block diagram illustrating an embodiment of a computing device configured for multi-context processing.

FIG. 1 illustrates one embodiment of computing device 100 configured for multi-context processing. Computing device 100 can be implemented as any device that can be used to process graphics and/or video images, such as a media device. For example, in some cases, computing device 100 can be a portable computing device, a cellular telephone, and/or a music, video, and/or graphics/image/photograph player. Advantageously, in certain embodiments, computing device 100 can be configured such that graphical operations in computing system 100 can be performed more efficiently than in previous devices. In other embodiments, computing device 100 can be configured such that computing device 100 can efficiently process multiple graphics processing requests and/or contexts from one or more applications executed within or received by computing device 100.

In certain embodiments, computing device 100 can include a general purpose computing device (e.g., an iPhone from Apple Inc.) or a special purpose computing device (e.g., graphics work stations). Such computing device 100 may include one or more services, databases, and the like. In addition, computing device 100 can be a hand-held or portable device, such as a laptop, personal digital system (PDA), cell phone, smart phone, or the like. More generally, any processor-based system may be used as computing device 100.

Computing device 100 can include one or more user-input devices 102. One user input device 102 is shown for illustrative purposes. User-input device 102 can be any device such as a mouse, keyboard, or the like. User-input device 102 receives input from one or more users and provides the input to controller 104. Controller 104 can include interface logic or the like that enables user-input device 102 to communicate with a microprocessor, or central processing unit (CPU) 106.

Microprocessor 106 of the computing device 100 may include multi-context processing module 108 to allow microprocessor 106 to manage multiple graphics processing requests, as will be described in greater detail below. Microprocessor 106 may also be configured to process one or more software programs stored in memory 110.

Microprocessor 106 can output images and video through graphics system 112 to display 114. In one embodiment, graphics system 112 can be configured for multi-pipeline processing. For example, graphics system 112 can be configured for two-stage pipeline processing, such as graphics system 200, described below with respect to FIG. 2.

While one microprocessor 106 is illustrated, in other embodiments, computing device 100 includes one or more additional processors, program logic, or other substrate configurations representing data and instructions, which can operate as described herein. In certain embodiments, microprocessor 106 includes controller circuitry, processor circuitry, single or multi-core processors including stream processors, general purpose, single-chip or multi-chip microprocessors, digital signal processors, embedded microprocessors, microcontrollers, graphics processors, and the like.

Figure 2:
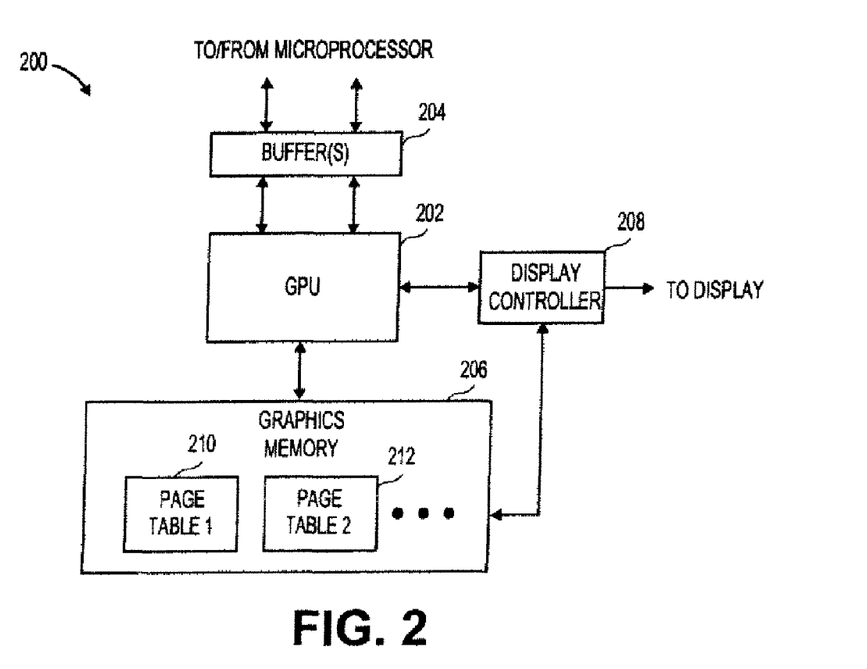
FIG. 2 is a block diagram illustrating an embodiment of a graphics processors configured for dual pipeline processing, and compatible with at least the computing device of FIG. 1.

FIG. 2 illustrates a graphics system compatible with computing device 100 of FIG. 1. In some embodiments, computing device 100 of FIG. 1 can include graphics system 200 of FIG. 2. Graphics system 200 can include one or more graphics processors (GPU) 202, which can include a single core or multiple cores, and may have multiple stream processors in certain implementations.

Advantageously, graphics system 200 of certain embodiments includes one or more buffer stages 204, which facilitate increasing processing efficiency of graphics system 200. Buffer stages 204 can function as an interface between GPU 202 and a microprocessor of a computing device. Buffer stages 204 can increase the efficiency, for example, of compositing processing of graphical and/or video images. In one implementation, buffer stages 204 facilitate increased processing efficiency by reducing GPU 202 idle cycles, which can occur if GPU 202 waits for compositing processing commands. Additional embodiments and features of suitable buffer stages 204 are described in U.S. application Ser. No. 12/397,334, filed Mar. 03, 2009, titled, "BUFFERS FOR DISPLAY ACCELERATION,", which is incorporated in its entirety herein by reference.

Graphics system 200 may include graphics memory 206 and display controller 208, as well. Graphics memory 206 can often stores information and data to be processed by the graphic system's GPU 202. Once processed, GPU 202 writes its output information into graphics memory 206. Graphics memory 206 may exist as dedicated memory for sole use by the graphics hardware, or portions of the general purpose memory (e.g., system memory 110 of FIG. 1) may be used as graphics memory 206.

Graphics system 200 may also perform mapping from virtual addresses to physical addresses by using page table 210 within graphics memory 206.

Advantageously, the multi-context processing module (e.g., the multi-context processing module 108 of FIG. 1) may create one or more additional page tables 212 in graphics memory 206, and at times command graphics system 200 to change which page table is used for address remapping. This can allow better use of limited virtual address range, for example, by creating a different page table for each task that is using graphics system 200. If one task uses a large amount of the available virtual address space within its associated page table 210, other tasks, which use a different page table, will not be prevented from allocating virtual address space.

Figure 3:
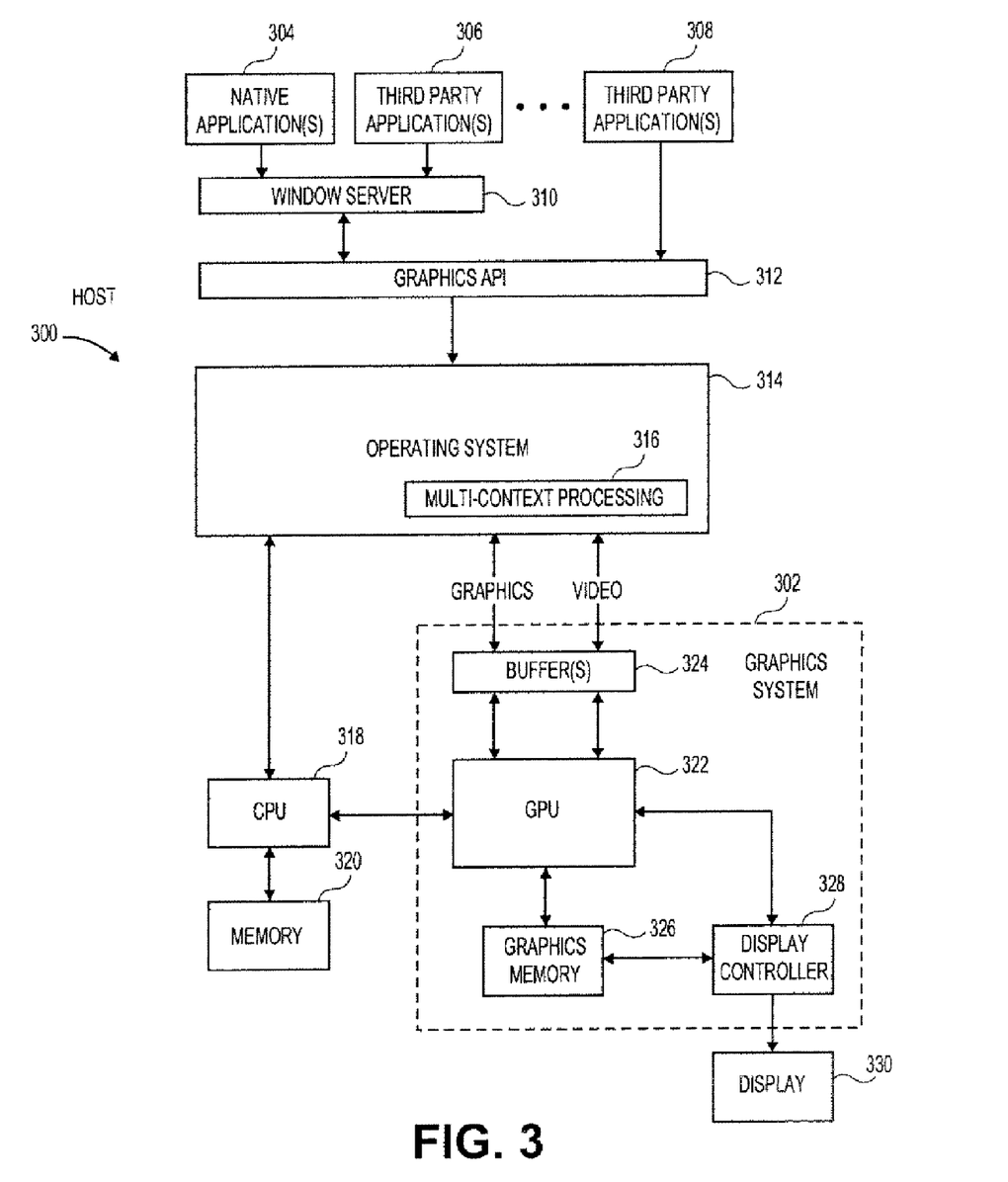
FIG. 3 is a block diagram illustrating another embodiment of a computing device configured for multi-context processing.

FIG. 3 illustrates a block diagram of another embodiment of a computing device. Computing device 300 can include graphics processing system 302, which in some embodiments is graphics processing system 200 of FIG. 2. Furthermore, in some implementations, computing device 300 is one embodiment of computing device 100 of FIG. 1.

In certain embodiments, one or more applications 304, 306, 308, or clients can run on computing device 300, for example, in or from a memory device (not shown). Applications 304, 306, 308 can include native applications 304 as well as third-party applications 306, 308. Native applications 304 can include applications that are provided by a vendor of the computing device 300. Common examples of native applications 304 include media players, calendaring applications, web browsers, system utilities, and the like. Third-party applications 306, 308, can include any application developed by a third party for computing device 300. Some examples include games, office software, and the like.

Certain applications 304, 306 are configured to send graphics processing commands or routine calls to window server 310. Window server 310, in certain embodiments, can be a module for managing the compositing of layers in graphical images and/or video. Window server 310 call be, in one implementation, the Core Animation™ software provided by Apple Inc.

In certain embodiments, window server 310 responds to graphics routine calls from applications 304, 306 by compositing graphics and/or video layers. These layers may include video layers, graphics layers, effects layers such as transparency (graphics) layers, and other layers. By compositing the various layers, window server 310 can enable layers of multiple applications, such as layers for user interfaces and layers for a video game, to cooperatively display on a screen. Advantageously, window server 310 in certain embodiments also provides animation services to applications 304, 306 and may generate and/or manage user interface windows.

While certain native applications 304 and certain third-party applications 306 send graphical routine calls to window server 310, some third-party applications 308 may send routine calls directly to a graphics layer or application programming interface (API) 312. Window server 310 likewise can send routine calls to graphics API 312. However, window server 310 in certain embodiments abstracts graphics API 312 from certain native and third-party applications 304, 306. Window server 310 can abstract graphics API 312 by, for example, generating routine calls to graphics API 312 based on the routine calls received by window server 310 from applications 304, 306. Similarly, certain third-party applications 308 send routine calls directly to graphics API 312.

Graphics API 312 can include routines for generating graphics commands for graphics system 302. Example graphics APIs include OpenGL™, OpenGL ES™, and DirectX™, and the like. By implementing certain routines from graphics API 312, window server 310 or certain third party applications 308 can send routine calls to operating system 314.

One advantage of enabling developers to provide third-party applications 308 that interface directly with graphics API 312 is that these applications 308 can have greater control over a display of computing device 300. One drawback to this approach, however, is that many computing devices, including cellular telephones and mobile multimedia players, are not configured to manage graphics commands, from both applications sending such commands via a window server (such as native and third party applications 304, 306) and applications sending commands directly to a graphics layer, or graphics API 312 (such as third party applications 308). Indeed, such multi-context processing can cause computational congestion, and can cause the computing device to potentially lock up. These problems can be solved by providing a multi-context processing module, as discussed in further detail below.

Computing device 300 also includes operating system 314 that can be configured to communicate with graphics API 312. Operating system 314 may include multi-context processing module 316 that helps manage processing of graphics routine calls requested from multiple applications 304, 306, 308 as will be described in greater detail below. Operating system 314 may interface with central processing unit 318, which can be in communication with memory 320. In some embodiments, memory 320 is about 1 GB, 2 GB, 4 GB, or 8 GB in size.

Operating system 314 can communicate graphics and video processing commands to graphics system 302. Graphics commands can include commands related to processing images using an RGB format. Video commands can include commands that are to be processed using a YUV format. Other formats may be used in certain embodiments. As used herein, the term "graphics commands" can refer to both graphics and video commands in certain embodiments.

Graphics system 302 may include graphics processing unit (GPU) 322, which communicates with CPU 318. In one embodiment, GPU 322 receives graphics and video processing commands and information from operating system 314 via buffers, or buffer stages 324. In certain embodiments, buffer stages 324 include multiple stages of buffers. The multiple stages of buffers can be configured as queues or as other data structures. Buffer stages 324 may store graphics and video commands until they are ready for processing by GPU 322. Advantageously, buffer stages 324 store and transfer graphics and video information in a manner that improves the efficiency of graphics system 302 over currently available devices. In other embodiments, GPU 322 receives such commands and information directly from operating system 314.

Graphics system 302 may also include graphics memory 326 and display controller 328. In some embodiments, graphics memory 326 is about 16 MB, 32 MB, or 64 MB in size. Memory 320 can be about 100 times the size of the graphics memory 326. Display controller 328 may control the transfer of frames stored in graphics memory 326 to display 330.

Operating system 314 may include one or more drivers (not shown), such as graphics drivers that translate the generated graphics commands into commands for CPU 322 of graphics system 302. In addition, the drivers can include display drivers for converting outputs from GPU 322 into an image for display 330. Operating system 314 can interact with CPU 318 to implement applications 304, 306, 308 as well as certain graphics preprocessing functions. For example, certain compositing preprocessing functions generated by window server 310 can be implemented by CPU 318. In addition, the drivers can be implemented using CPU 318.

As discussed above, if graphics system 302 receives commands from multiple contexts, and if graphics system 302 itself is not configured to manage such multiple contexts, system performance can be adversely affected. For example, graphics system 302, in some cases, could significantly slow down or freeze up. Therefore, to avoid such performance issues, computing device 300 includes multi-context processing module 316.

Multi-context processing module 316 may be configured to manage the delivery of commands from multiple contexts to graphics system 302. For example, in one embodiment, multicontext processing module 316 may receive commands from multiple applications 304, 306, 308, either via window server 310 and graphics API 312, or only via graphics API 312. Multi-context processing module 316 can check to see if graphics system 302 is ready to process commands from a context other than the last used context. If so, multi-context processing module 316 sends the next commands to graphics system 302. However, if graphics system 302 is busy, or otherwise not ready to process commands from a different context, multi-context processing module 316 saves the context to a memory, such as memory 320 in communication with the device's CPU 318. When graphics system 302 becomes ready to process another context, multi-context processing module 316 can retrieve a context from memory, and send it to graphics system 302.

Figure 4:
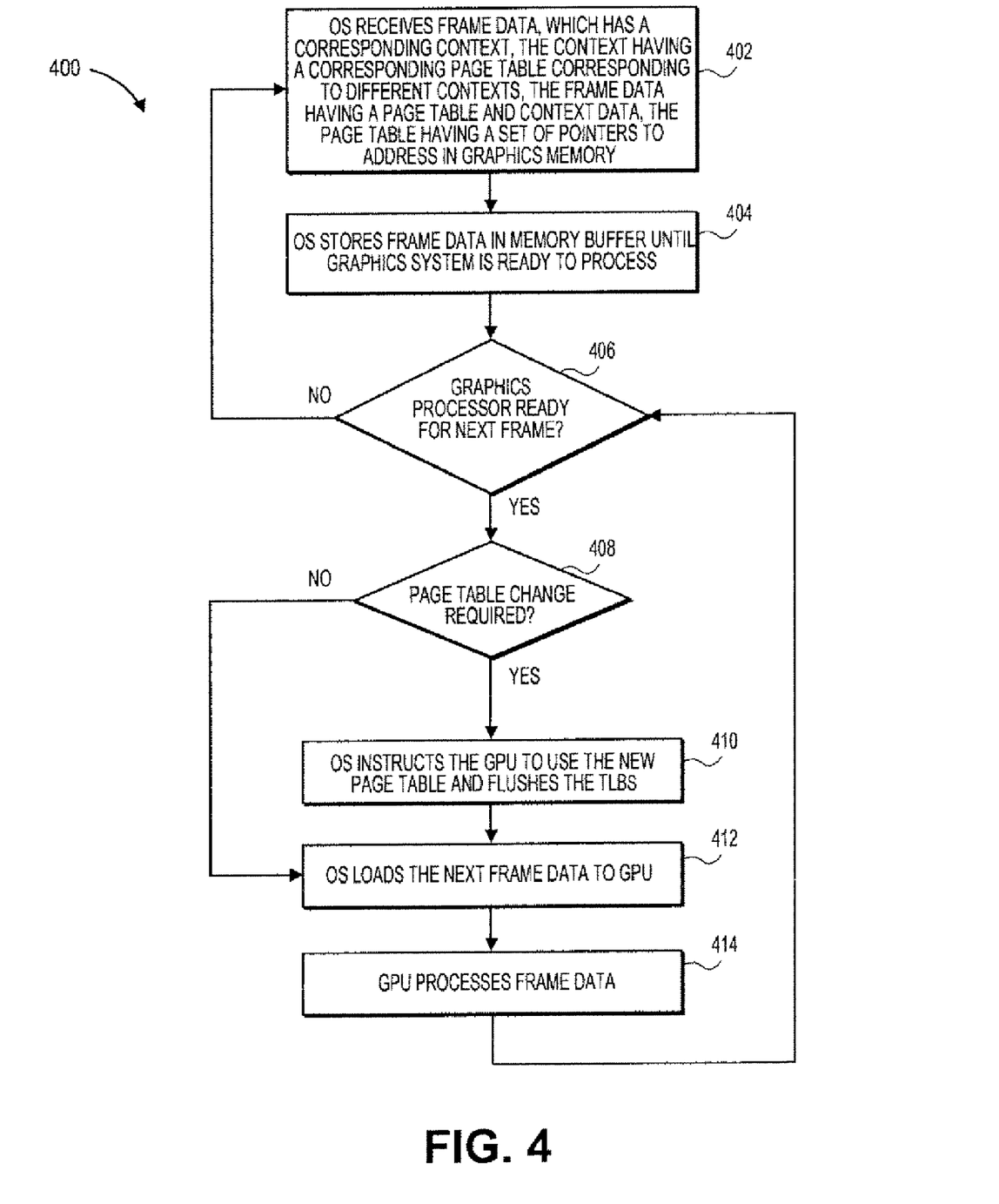
FIG. 4 is a flowchart diagram illustrating an embodiment of a multi-context graphics processing management method, which can be implemented at least by the embodiments of FIGS. 1 and 3.

FIG. 4 illustrates a method of multi-context graphics processing management. In various embodiments, method 400 can be performed by either of computing devices 100, 300 described above.

At block 402, an operating system may receive frame data, which can have a corresponding context. The context can have a corresponding page table, and possibly additional context data. Multiple contexts may or may not share the same page table. A GPU (such as GPU 322 of FIG. 3) can be configured to use this page table so the GPU can execute these commands.

At block 404, the operating system stores the frame data in a memory buffer until the graphics system is available. In one embodiment, the operating system stores the frame data in a memory buffer outside of the graphics system until the graphics system is ready to process another context.

At block 406, method 400 determines if the graphics system is ready for the next frame. If not, method 400 returns to block 402. However, if the graphics system is ready for the next frame, method 400 continues to block 408.

At block 408, method 400 determines if a page table change is required. If so, method proceeds to block 410. However, if a page table change is not required, method 400 jumps to block 412. For example, a page table change can be needed if the last frame required the use of a different page table than the next frame. At block 410 the operating system instructs the GPU to use the new page table, and flushes the translation lookaside buffers (TLBs). At block 412, the operating system loads the next frame data to the GPU. At block 414, the CPU processes the frame data. Method 400 then returns to block 406, where method 400 once again determines if the graphics system is ready to process the next frame.

Figure 5:
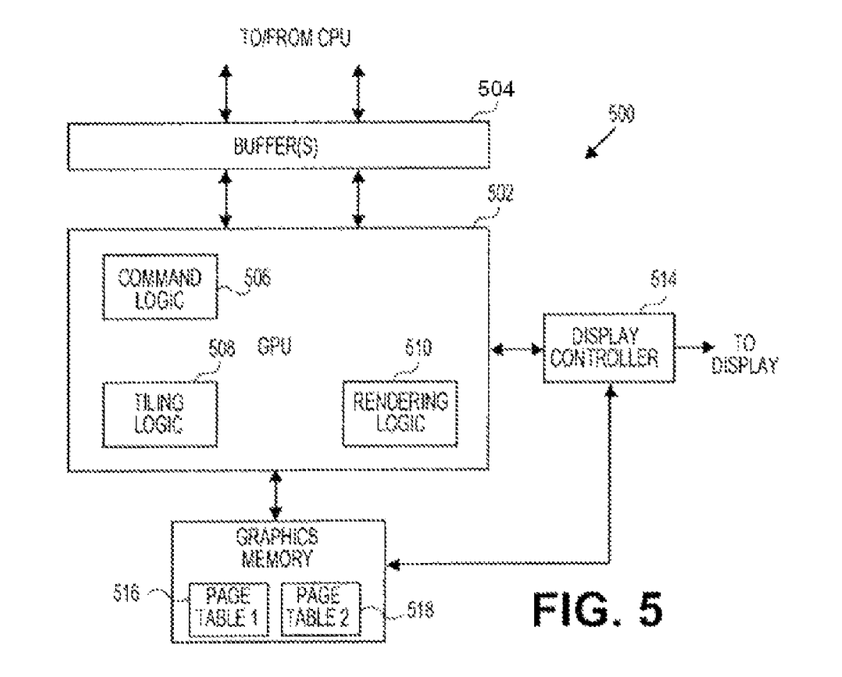
FIG. 5 is a block diagram illustrating an embodiment of a dual pipeline graphic processor configured to perform tiling and rendering operations.

FIG. 5 illustrates one embodiment of a two pipeline stage graphics system (sometimes referred to as two-stage graphics system 500, two-stage system 500, graphics system 500, or system 500), which can be compatible with computing devices 100, 300 of FIGS. 1 and 3. In some embodiments, two pipeline stage graphics system 500 is graphics system 112, 200, 302 of FIGS. 1, 2 and 3. Two-stage graphics system 500 of FIG. 5 may be configured to perform two graphics computing operations via a pipeline. For example, in the illustrated embodiment, two-stage graphics system 500 can perform tiling operations and rendering operations in each stage, respectively. In other embodiments, system 500 can perform more than two graphics computing operations via a pipeline.

Two-stage graphics system 500 can include graphics processing unit 502. Graphics system 500 can include buffers 504 that enable the transfer of information between a CPU and GPU 502. However, in some embodiments, buffers 504 are not included.

Two stage graphics system 500 can also include command logic 506, tiling logic 508, and rendering logic 510, to enable two stage operation. Graphics system 500 can also include graphics memory 512 and display controller 514. Graphics memory 512 may include page tables 516 and 518.

Figure 6:
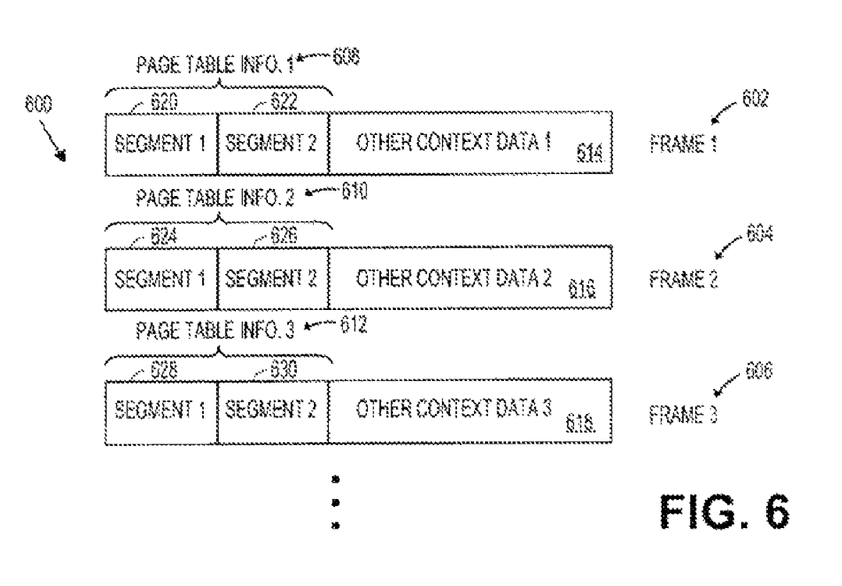
FIG. 6 is a block diagram illustrating an embodiment of frame data from different contexts, compatible with at least the dual pipeline graphics processors of FIGS. 2 and 5.

Graphics system 500 can receive frame data corresponding to multiple contexts, or graphics/video processing requests. For example, in one embodiment, graphics system 500 can receive frame data 600 as illustrated in FIG. 6. Each frame 602, 604, 606 corresponds to a different context. Each context can include page table information 608, 610, 612 and other context data 614, 616, 618.

For example, page table information 608 corresponding to first frame 602 can include a page table that has been logically divided by the graphics driver into two segments 620, 622. Page table information 610, 612 corresponding to second and third frames 604, 606, can include first and second segments 624, 626 and 628, 630, respectively.

For each frame 602, 604, 606, first page table segments 620, 624, 628 may indicate the location in memory where information required to perform a first pipeline operation resides. For example, in one embodiment, information, such as commands or data, useful to execute a tiling operation for each frame 602, 604, 606, may be stored in memory at locations indicated by first page table segments 620, 624, 628.

Similarly, for each frame 602, 604, 606, second page table segments 622, 626, 630 can indicate the location in memory where information for a second pipeline operation reside. For example, in one embodiment, information, such as commands or data, useful to execute a rendering operation for each frame 602, 604, 606, can be stored in memory at locations indicated by second page table segment 622, 626, 630.

However, in some embodiments, such as when the first pipeline operation only uses a small amount of memory compared to the second pipeline operation, memory may be preserved, and system performance can be greatly improved, by collapsing the first pipeline operations such that they utilizes the same, relatively small portion of memory, compared to the second pipeline operation. For example, when the first pipeline operation is a tiling operation, and the second pipeline operation is a rendering operation, system performance can be enhanced by having all page table segments corresponding to the tiling operation utilize the same memory space, such as illustrated in FIG. 7.

Figure 7:
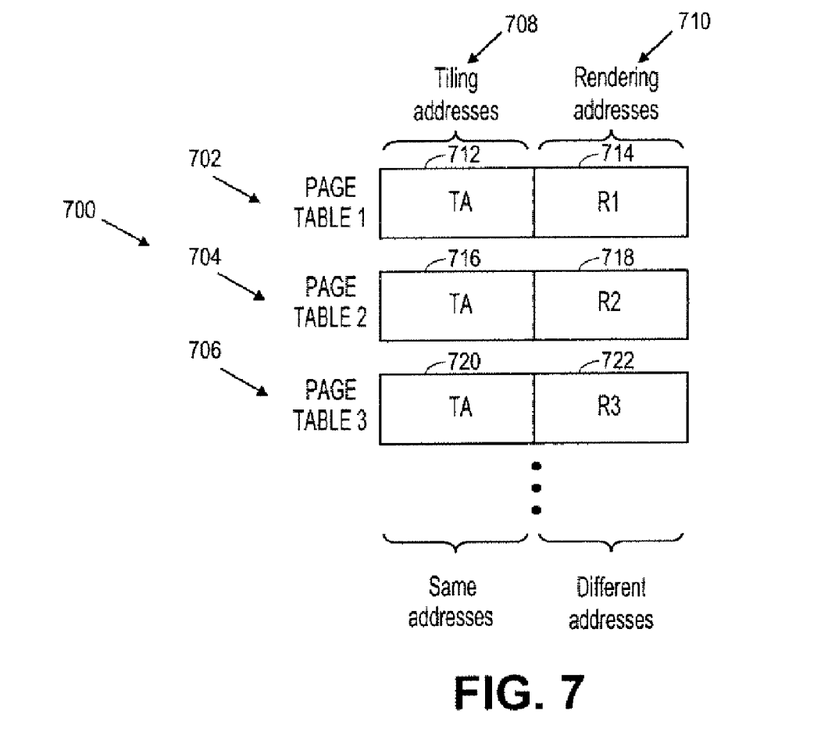
FIG. 7 is a block diagram illustrating frame pointers showing shared tiling portions and unique rendering portions, compatible with at least the frame data of FIG. 6 and the dual pipeline graphics processors of FIGS. 2 and 5.

Frame data 700 of FIG. 7 includes page tables 702, 704, 706 that can correspond to different contexts. Each page table 702, 704, 706 can include tiling addresses 708 corresponding to a tiling operation and rendering addresses 710 corresponding to a rendering operation. For example, the first page table 702 can include tiling page table 712 and rendering page table 714. Similarly, second and third page tables 704, 706 can each include corresponding tiling and rendering page tables 716, 718, and 720, 722, as well.

However, because the tiling operation requires significantly less memory than the rendering operation, all of the tiling addresses 708 may be configured to point to the same portion of the graphics memory (e.g., graphics memory 512 of FIG. 5). Frames 700 may include a shared memory portion (e.g., the same portion of memory) corresponding to tiling addresses 708 and tiling page tables 716, 718, 720, and a unique memory portion (e.g., different portions of memory) corresponding to rendering addresses 710 and rendering page tables 714, 718, and 722.

In one embodiment, tiling page tables 712, 716, 720 of page tables 702, 704, 706 may correspond to first segment portions 620, 624, 628 of page table information 608, 610, 612 of FIG. 6. Similarly, the rendering page tables 714, 718, 722 of the page tables 702, 704, 706 may correspond to second segment portions 622, 626, 630 of page table information 608, 610, 612 of FIG. 6.

Figure 8:
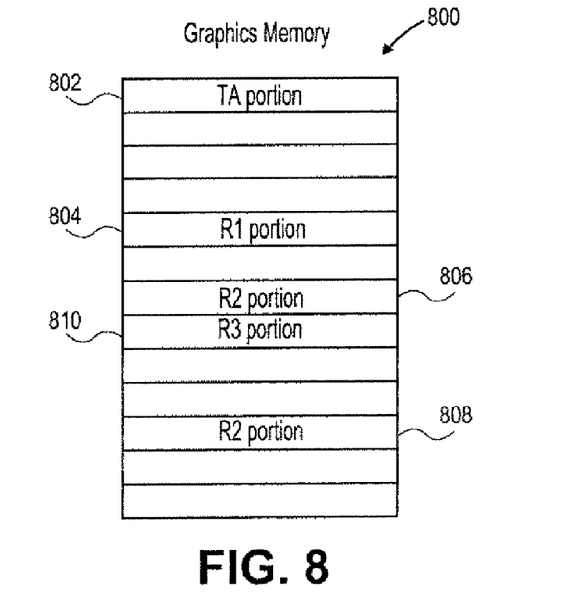
FIG. 8 is a block diagram illustrating a graphics memory, compatible at least with the embodiments of FIGS. 1-7.

One embodiment of a graphics memory useful with frame data 700 of FIG. 7, frame data 600 of FIG. 6, as well as two stage graphics system 500 of FIG. 5, is illustrated in FIG. 8. Graphics memory 800 may include shared tiling portion 802 as well as unique rendering portions 804-810. In the illustrated embodiment, shared tiling portion 802 can correspond to tiling addresses 712, 716, 720 of the three page tables 702, 704, 706 of FIG. 7. Rendering portions 804-810 may correspond to unique memory portions referenced by rendering page tables 714, 718, 722 of FIG. 7. For example, R1 rendering portion 804 of memory 800 can correspond to rendering page table 714 associated with first page table 702 of FIG. 7. Similarly, R2 rendering portions 806, 808 of memory 800 may correspond to rendering page table 718 associated with second page table 704 of FIG. 7. Finally, R3 rendering portion 810 of memory 800 may correspond to rendering page table 722 associated with third page table 706 of FIG. 7.

Figure 9:
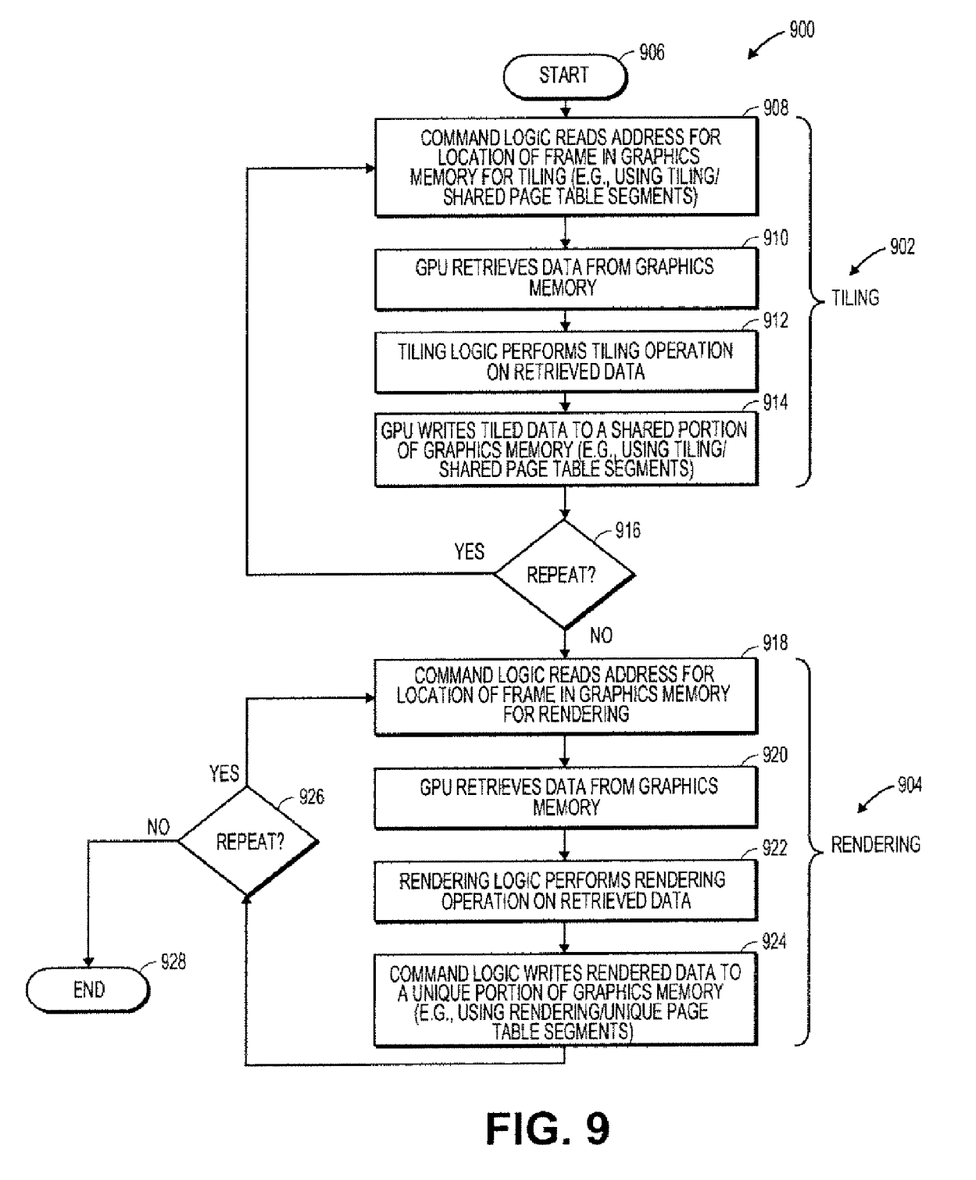
FIG. 9 is a flowchart diagram illustrating a dual pipeline graphics processing method, which can be implemented at least by the embodiments of FIGS. 1-3 and 5.

One embodiment of a method of two stage graphics processing is illustrated in method 900 of FIG. 9. In various embodiments, method 900 can be executed or implemented on any of the devices or systems described above. For example, method 900 can be implemented with two stage graphics system 500 of FIG. 5 using frames 602, 604, 606 of FIG. 6, page tables 702, 704, 706 of FIG. 7, as well as graphics memory 800, as configured in FIG. 8.

Method 900 may include tiling sequence 902 and rendering sequence 904, which can be executed as a pipeline. For example, the output of tiling sequence 902 can be used as the input to rendering sequence 904. Tiling sequence 902 may repeat itself as long as the host device generates commands for tiling processing.

At block 908, command logic, such as command logic within a CPU, can read addresses for the location of frame data in graphics memory for a first pipeline operation, such as a tiling operation. At block 910, the GPU may retrieve data from graphics memory using the addresses acquired in block 908. At block 912, tiling logic can perform a tiling operation on the retrieved data. Then, at block 914, the GPU may write the tiling operation's output data to a shared portion of the graphics memory.

Method 900 may then continue to block 916. At block 916, method 900 can determine if tiling operation 902 should be repeated. For example, method 900 may determine if there are any additional commands to be processed with tiling operation 902. If so, method 900 may return to block 908. If not, method 900 can continue to block 918.

At block 918, the command logic may read addresses for the location of frame data in graphics memory for a second pipeline operation, such as a rendering operation. For example, in one embodiment, method 900 can read the data from the last tiling/shared memory segment, e.g., to read the data that was produced by the tiling stage. At block 920, the GPU may retrieve data from graphics memory using the data produced in block 918. At block 922, rendering logic may perform a rendering operation on the retrieved data. Then, at block 924. The GPU can write the rendering operation's output data to a unique portion of graphics memory.

Method 900 may then continues to block 926, where it can determines if rendering operation 904 should be repeated. For example, method 900 may determine if there are any additional commands to be processed with rendering operation 904. If so, method 900 may return to block 918. If not, method 900 can continue to block 928, where method 900 ends.

Figure 10A:
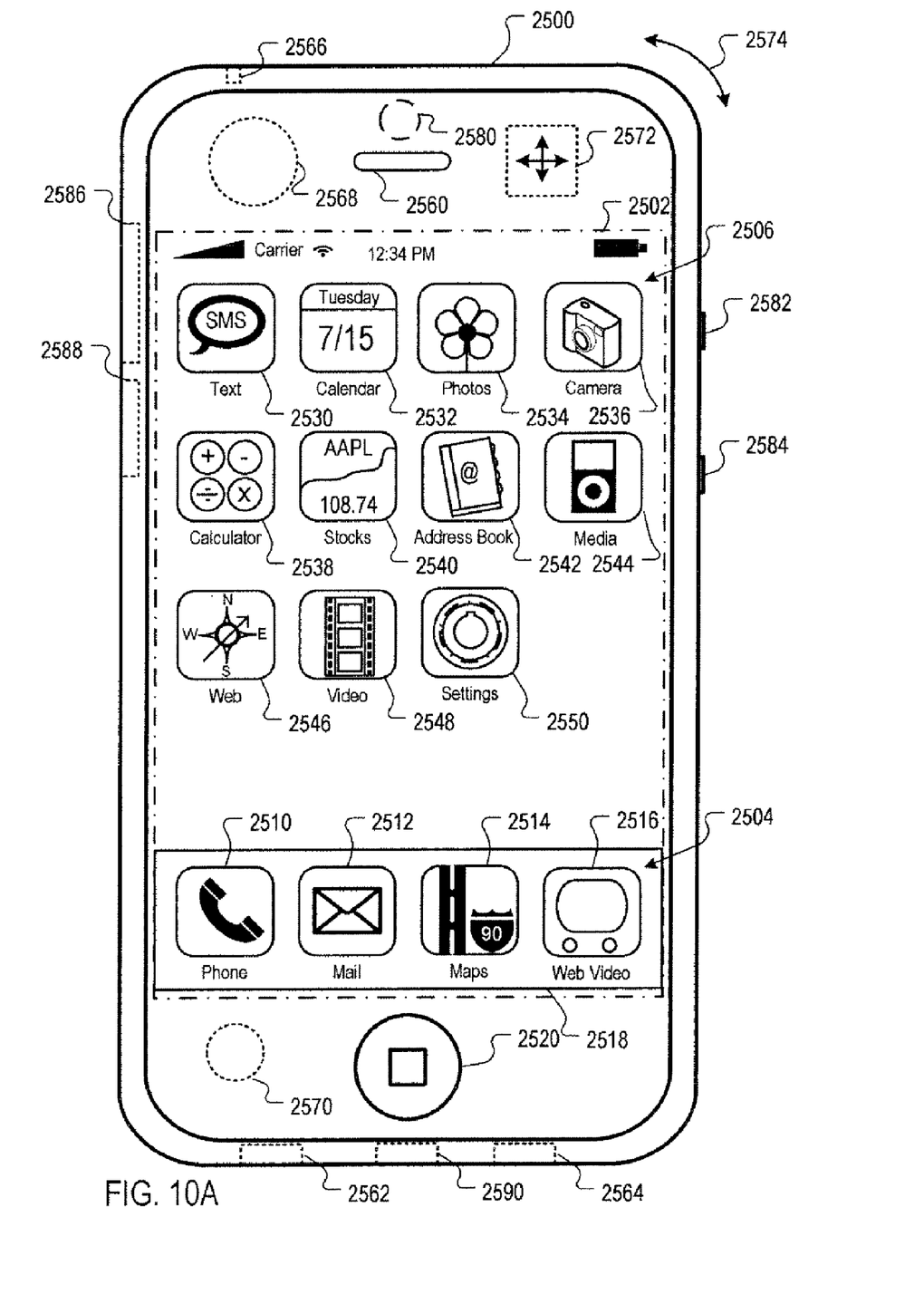
FIG. 10A illustrates an example mobile device that can be configured to implement any of the methods, or to include any of the devices or systems described with respect to FIGS. 1-9.

FIG. 10A illustrates an example mobile device 2500. The mobile device 2500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 2500 includes a touch-sensitive display 2502. The touch-sensitive display 2502 can be implemented with liquid crystal display (LCD) technology, light emitting polymer display (LPD) technology, or some other display technology. The touch-sensitive display 2502 can be sensitive to haptic and/or tactile contact with a user.

In some implementations, the touch-sensitive display 2502 can include a multi-touch-sensitive display 2502. A multi-touch-sensitive display 2502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 2500 can display one or more graphical user interfaces on the touch-sensitive display 2502 for providing the user access to various system objects and for conveying information to the user. In some implementations, the graphical user interface can include one or more display objects 2504, 2506. In the example shown, the display objects 2504, 2506, are graphic representations of system objects. Some examples of system objects include device functions, applications, windows, files, alerts, events, or other identifiable system objects.

Example Mobile Device Functionality

In some implementations, the mobile device 2500 can implement multiple device functionalities, such as a telephony device, as indicated by a Phone object 2510; an e-mail device, as indicated by the Mail object 2512; a map devices, as indicated by the Maps object 2514; a Wi-Fi base station device (not shown); and a network video transmission and display device, as indicated by the Web Video object 2516. In some implementations, particular display objects 2504, e.g., the Phone object 2510, the Mail object 2512, the Maps object 2514, and the Web Video object 2516, can be displayed in a menu bar 2518. In some implementations, device functionalities can be accessed from a top-level graphical user interface, such as the graphical user interface illustrated in FIG. 10A. Touching one of the objects 2510, 2512, 2514, or 2516 can, for example, invoke a corresponding functionality.

In some implementations, the mobile device 2500 can implement a network distribution functionality. For example, the functionality can enable the user to take the mobile device 2500 and provide access to its associated network while traveling. In particular, the mobile device 2500 can extend Internet access (e.g., Wi-Fi) to other wireless devices in the vicinity. For example, mobile device 2500 can be configured as a base station for one or more devices. As such, mobile device 2500 can grant or deny network access to other wireless devices.

In some implementations, upon invocation of a device functionality, the graphical user interface of the mobile device 2500 changes, or is augmented or replaced with another user interface or user interface elements, to facilitate user access to particular functions associated with the corresponding device functionality. For example, in response to a user touching the Phone object 2510, the graphical user interface of the touch-sensitive display 2502 may present display objects related to various phone functions; likewise, touching of the Mail object 2512 may cause the graphical user interface to present display objects related to various e-mail functions; touching the Maps object 2514 may cause the graphical user interface to present display objects related to various maps functions; and touching the Web Video object 2516 may cause the graphical user interface to present display objects related to various web video functions.

In some implementations, the top-level graphical user interface environment or state of FIG. 10A can be restored by pressing a button 2520 located near the bottom of the mobile device 2500. In some implementations, each corresponding device functionality may have corresponding "home" display objects displayed on the touch-sensitive display 2502, and the graphical user interface environment of FIG. 10A can be restored by pressing the "home" display object.

In some implementations, the top-level graphical user interface can include additional display objects 2506, such as a short messaging service (SMS) object 2530, a Calendar object 2532, a Photos object 2534, a Camera object 2536, a Calculator object 2538, a Stocks object 2540, a Address Book object 2542, a Media object 2544, a Web object 2546, a Video object 2548, a Settings object 2550, and a Notes object (not shown). Touching the SMS display object 2530 can, for example, invoke an SMS messaging environment and supporting functionality; likewise, each selection of a display object 2532, 2534, 2536, 2538, 2540, 2542, 2544, 2546, 2548, and 2550 can invoke a corresponding object environment and functionality.

Additional and/or different display objects can also be displayed in the graphical user interface of FIG. 10A. For example, if the device 2500 is functioning as a base station for other devices, one or more "connection" objects may appear in the graphical user interface to indicate the connection. In some implementations, the display objects 2506 can be configured by a user, e.g., a user may specify which display objects 2506 are displayed, and/or may download additional applications or other software that provides other functionalities and corresponding display objects.

In some implementations, the mobile device 2500 can include one or more input/output (I/O) devices and/or sensor devices. For example, a speaker 2560 and a microphone 2562 can be included to facilitate voice-enabled functionalities, such as phone and voice mail functions. In some implementations, an up/down button 2584 for volume control of the speaker 2560 and the microphone 2562 can be included. The mobile device 2500 can also include an on/off button 2582 for a ring indicator of incoming phone calls. In some implementations, a loud speaker 2564 can be included to facilitate hands-free voice functionalities, such as speaker phone functions. An audio jack 2566 can also be included for use of headphones and/or a microphone.

In some implementations, a proximity sensor 2568 can be included to facilitate the detection of the user positioning the mobile device 2500 proximate to the user's ear and, in response, to disengage the touch-sensitive display 2502 to prevent accidental function invocations. In some implementations, the touch-sensitive display 2502 can be turned off to conserve additional power when the mobile device 2500 is proximate to the user's ear.

Other sensors can also be used. For example, in some implementations, an ambient light sensor 2570 can be utilized to facilitate adjusting the brightness of the touch-sensitive display 2502. In some implementations, an accelerometer 2572 can be utilized to detect movement of the mobile device 2500, as indicated by the directional arrow 2574. Accordingly, display objects and/or media can be presented according to a detected orientation, e.g., portrait or landscape. In some implementations, the mobile device 2500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 2500 or provided as a separate device that can be coupled to the mobile device 2500 through an interface (e.g., port device 2590) to provide access to location-based services.

In some implementations, a port device 2590, e.g., a Universal Serial Bus (USB) port, or a docking port, or some other wired port connection, can be included. The port device 2590 can, for example, be utilized to establish a wired connection to other computing devices, such as other communication devices 2500, network access devices, a personal computer, a printer, a display screen, or other processing devices capable of receiving and/or transmitting data. In some implementations, the port device 2590 allows the mobile device 2500 to synchronize with a host device using one or more protocols, such as, for example, the TCP/IP, HTTP, UDP and any other known protocol.

The mobile device 2500 can also include a camera lens and sensor 2580. In some implementations, the camera lens and sensor 2580 can be located on the back surface of the mobile device 2500. The camera can capture still images and/or video.

The mobile device 2500 can also include one or more wireless communication subsystems, such as an 802.11b/g communication device 2586, and/or a Bluetooth™ communication device 2588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 10B:
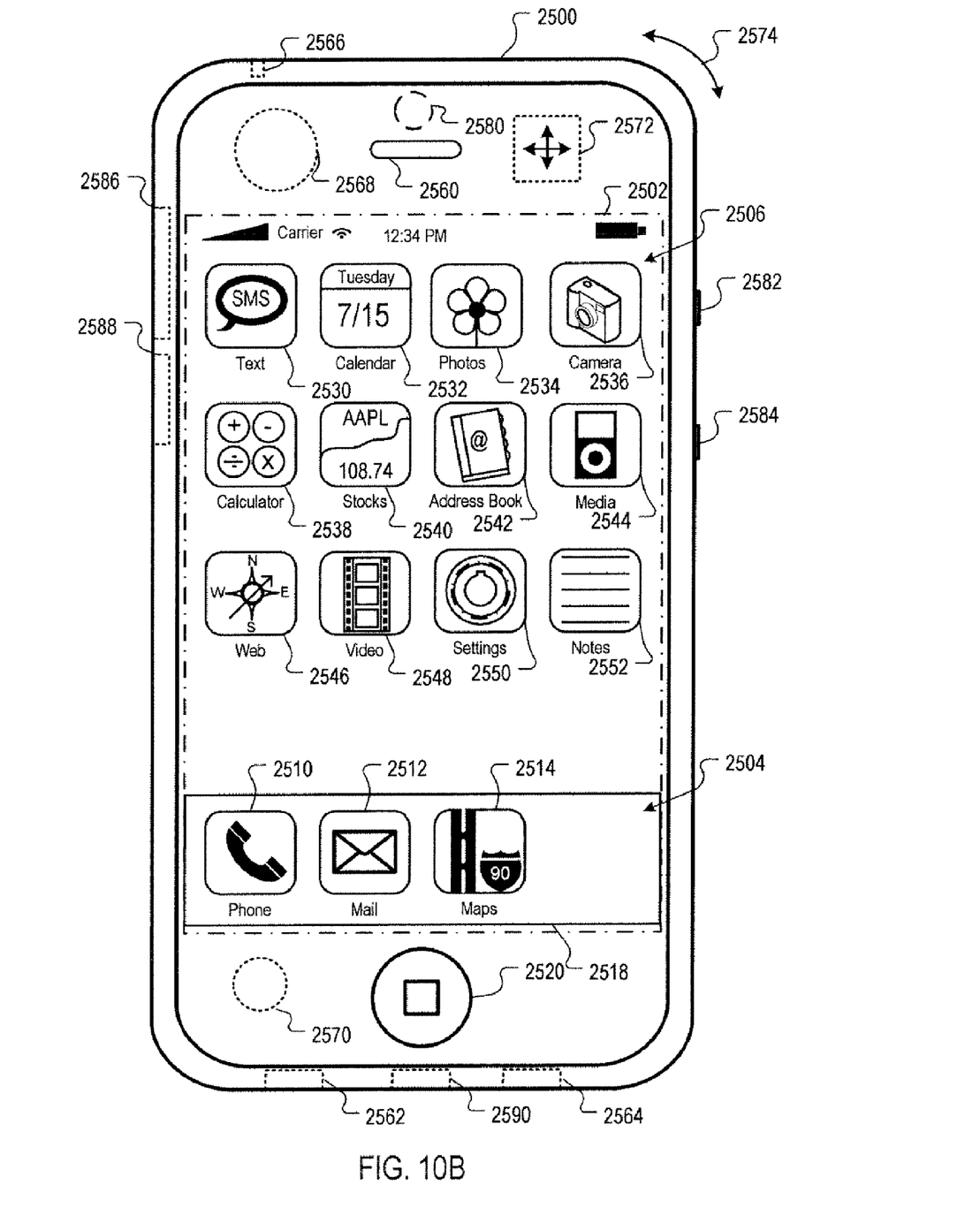
FIG. 10B illustrates another example of a configurable top-level graphical user interface of the device of FIG. 10A.

FIG. 10B illustrates another example of configurable top-level graphical user interface of device 2500. The device 2500 can be configured to display a different set of display objects.

In some implementations, each of one or more system objects of device 2500 has a set of system object attributes associated with it; and one of the attributes determines whether a display object for the system object will be rendered in the top-level graphical user interface. This attribute can be set by the system automatically, or by a user through certain programs or system functionalities as described below. FIG. 10B shows an example of how the Notes object 2552 (not shown in FIG. 10A) is added to and the Web Video object 2516 is removed from the top graphical user interface of device 2500 (e.g. such as when the attributes of the Notes system object and the Web Video system object are modified).

Example Mobile Device Architecture

Figure 11:
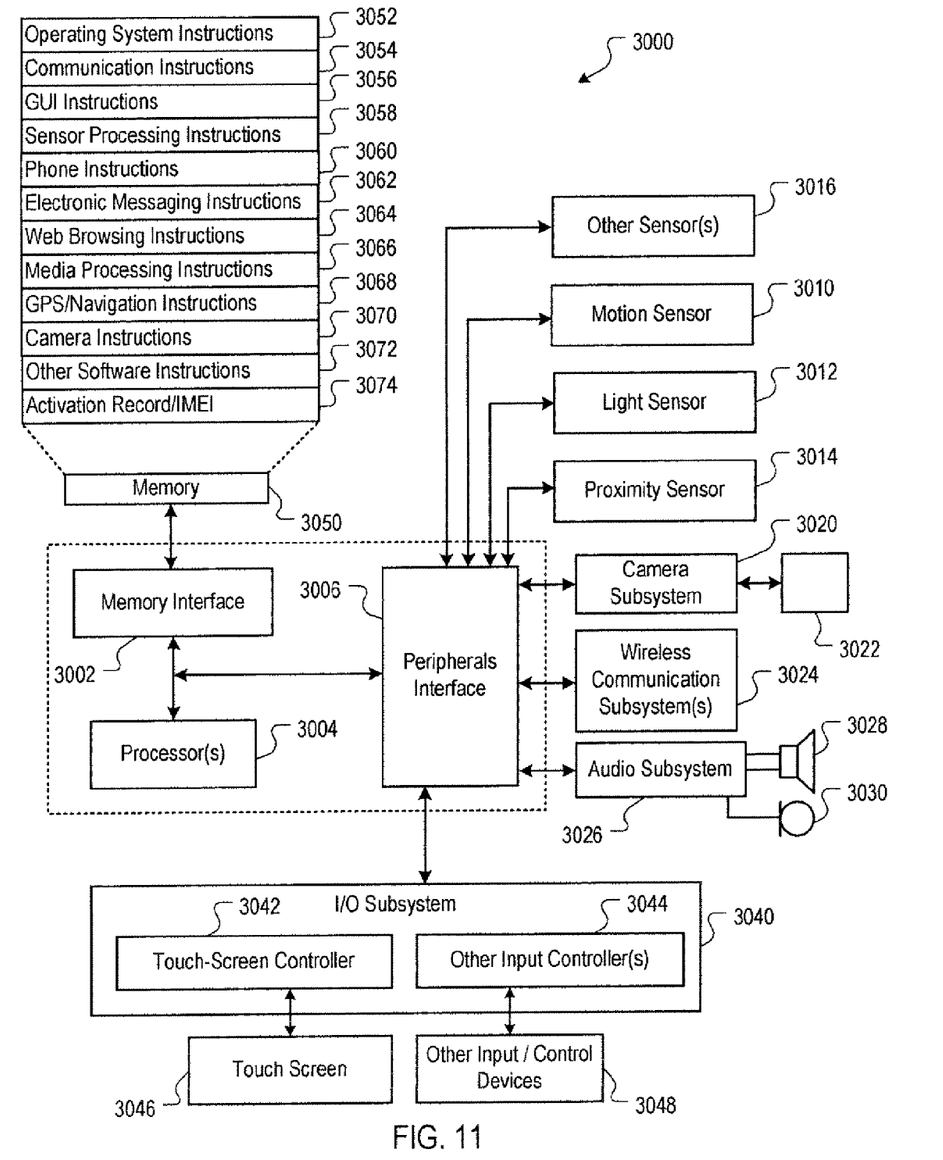
FIG. 11 is a block diagram of an example implementation of a mobile device, such as the mobile device of FIGS. 10A or 10B.

FIG. 11 is a block diagram 3000 of an example implementation of a mobile device (e.g., mobile device 2500). The mobile device can include a memory interface 3002, one or more data processors, image processors and/or central processing units 3004, and a peripherals interface 3006. The memory interface 3002, the one or more processors 3004 and/or the peripherals interface 3006 can be separate components or can be integrated in one or more integrated circuits. The various components in the mobile device can be coupled by one or more communication buses or signal lines.

Sensors, devices, and subsystems can be coupled to the peripherals interface 3006 to facilitate multiple functionalities. For example, a motion sensor 3010, a light sensor 3012, and a proximity sensor 3014 can be coupled to the peripherals interface 3006 to facilitate the orientation, lighting, and proximity functions described with respect to FIG. 10A. Other sensors 3016 can also be connected to the peripherals interface 3006, such as a positioning system (e.g., GPS receiver), a temperature sensor, a biometric sensor, or other sensing device, to facilitate related functionalities.

A camera subsystem 3020 and an optical sensor 3022, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 3024, which can include radio frequency receivers and transmitters and/or optical (e.g., infrared) receivers and transmitters. The specific design and implementation of the communication subsystem 3024 can depend on the communication network(s) over which the mobile device is intended to operate. For example, a mobile device can include communication subsystems 3024 designed to operate over a GSM network, a GPRS network, an EDGE network, a Wi-Fi or WiMax network, and a Bluetooth™ network. In particular, the wireless communication subsystems 3024 may include hosting protocols such that the mobile device may be configured as a base station for other wireless devices.

An audio subsystem 3026 can be coupled to a speaker 3028 and a microphone 3030 to facilitate voice-enabled functions, such as voice recognition, voice replication, digital recording, and telephony functions.

The I/O subsystem 3040 can include a touch screen controller 3042 and/or other input controller(s) 3044. The touch-screen controller 3042 can be coupled to a touch screen 3046. The touch screen 3046 and touch screen controller 3042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3046.

The other input controllers 3044 can be coupled to other input/control devices 3048, such as one or more buttons, rocker switches, thumb-wheel, infrared port, USB port, and/or a pointer device such as a stylus. The one or more buttons (not shown) can include an up/down button for volume control of the speaker 3028 and/or the microphone 3030.

In one implementation, a pressing of the button for a first duration may disengage a lock of the touch screen 3046; and a pressing of the button for a second duration that is longer than the first duration may turn power to the mobile device on or off. The user may be able to customize a functionality of one or more of the buttons. The touch screen 3046 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 3002 can be coupled to memory 3050. The memory 3050 can include high-speed random access memory and/or non-volatile memory, such as one or more magnetic disk storage devices, one or more optical storage devices, and/or flash memory (e.g., NAND, NOR). The memory 3050 can store an operating system 3052, such as Darwin, RTXC, LINUX, UNIX, OS X, WINDOWS, or an embedded operating system such as VxWorks. The operating system 3052 may include instructions for handling basic system services and for performing hardware dependent tasks. In some implementations, the operating system 3052 can be a kernel (e.g., UNIX kernel).

The memory 3050 may also store communication instructions 3054 to facilitate communicating with one or more additional devices, one or more computers and/or one or more servers. The memory 3050 may include graphical user interface instructions 3056 to facilitate graphic user interface processing; sensor processing instructions 3058 to facilitate sensor-related processing and functions; phone instructions 3060 to facilitate phone-related processes and functions; electronic messaging instructions 3062 to facilitate electronic-messaging related processes and functions; web browsing instructions 3064 to facilitate web browsing-related processes and functions; media processing instructions 3066 to facilitate media processing-related processes and functions; GPS/Navigation instructions 3068 to facilitate GPS and navigation-related processes and instructions; camera instructions 3070 to facilitate camera-related processes and functions; and/or other software instructions 3072 to facilitate other processes and functions, e.g., access control management functions. The memory 3050 may also store other software instructions (not shown), such as web video instructions to facilitate web video-related processes and functions; and/or web shopping instructions to facilitate web shopping-related processes and functions. In some implementations, the media processing instructions 3066 are divided into audio processing instructions and video processing instructions to facilitate audio processing-related processes and functions and video processing-related processes and functions, respectively. An activation record and International Mobile Equipment Identity (IMEI) 3074 or similar hardware identifier can also be stored in memory 3050.

Each of the above identified instructions and applications can correspond to a set of instructions for performing one or more functions described above. These instructions need not be implemented as separate software programs, procedures, or modules. The memory 3050 can include additional instructions or fewer instructions. Furthermore, various functions of the mobile device may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media and computer readable storage media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors. In addition, the code modules may include, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions disclosed herein.

What is claimed is:

1. A method of multi-stage pipeline graphics processing, comprising:
    receiving a plurality of graphics processing tasks;
    determining respective contexts for each task:
    performing, by a computer, a first graphics processing operation for each of said contexts using a first portion of a graphics memory, wherein the first portion of graphics memory is shared by each said first graphics processing operation for each of said contexts; and
    performing a second graphics processing operation on results of said performing a first graphics processing operation, wherein said performing a second graphics processing operation occurs using a different portion of said graphics memory for each context, and wherein each different portion of said graphics memory for each context is separate from the first portion of graphics memory.

2. The method of claim 1, wherein said first graphics processing operation comprises a tiling operation.

3. The method of claim 1, wherein said second graphics processing operation comprises a rendering operation.

4. The method of claim 1, wherein the first portion is determined using a first segment of a page table associated with each context.

5. The method of claim 1, wherein the different portions are determined using a second segment of a page table associated with each context.

6. The method of claim 1, wherein each context is associated with a page table that has a first segment associated with the first graphics processing operation, and a second segment associated with the second graphics processing operation.

7. The method of claim 1, wherein said performing a first graphics operation is configured to be performed using less memory resources than said performing a second graphics operation.

8. A non-transitory machine readable storage medium storing executable instructions which when executed by a processor cause the processor to perform operations for multi-stage pipeline graphics processing, the operations comprising:
   receiving a plurality of graphics processing tasks;
   determining respective contexts for each task,
   performing, by a computer, a first graphics processing operation for each of said contexts using a first portion of a graphics memory, wherein the first portion of graphics memory is shared by each said first graphics processing operation for each of said contexts; and
   performing a second graphics processing operation on results of said performing a first graphics processing operation, wherein said performing a second graphics processing operation occurs using a different portion of said graphics memory for each context, and wherein each different portion of said graphics memory for each context is separate from the first portion of graphics memory.

9. The non-transitory machine readable storage medium of claim 8, wherein said first graphics processing operation comprises a tiling operation.

10. The non-transitory machine readable storage medium of claim 8, wherein said second graphics processing operation comprises a rendering operation.

11. The non-transitory machine readable storage medium of claim 8, wherein the first portion is determined using a first segment of a page table associated with each context.

12. The non-transitory machine readable storage medium of claim 8, wherein the different portions are determined using a second segment of a page table associated with each context.

13. The non-transitory machine readable storage medium of claim 8, wherein each context is associated with a page table that has a first segment associated with the first graphics processing operation, and a second segment associated with the second graphics processing operation.

14. The non-transitory machine readable storage medium of claim 8, wherein said performing a first graphics operation is configured to be performed using less memory resources than said performing a second graphics operation.

15. A data processing system comprising:
   means for receiving a plurality of graphics processing tasks;
   means for determining respective contexts for each task,
   means for performing, by a computer, a first graphics processing operation for each of said contexts using a first portion of a graphics memory, wherein the first portion of graphics memory is shared by each said first graphics processing operation for each of said contexts; and
   means for performing a second graphics processing operation on results of said performing a first graphics processing operation, wherein said performing a second graphics processing operation occurs using a different portion of said graphics memory for each context, and wherein each different portion of said graphics memory for each context is separate from the first portion of graphics memory.

16. The data processing system of claim 15, wherein said first graphics processing operation comprises a tiling operation.

17. The data processing system of claim 15, wherein said second graphics processing operation comprises a rendering operation.

18. The data processing system of claim 15, wherein the first portion is determined using a first segment of a page table associated with each context.

19. The data processing system of claim 15, wherein the different portions are determined using a second segment of a page table associated with each context.

20. The data processing system of claim 15, wherein each context is associated with a page table that has a first segment associated with the first graphics processing operation, and a second segment associated with the second graphics processing operation.

21. The data processing system of claim 15, wherein said performing a first graphics operation is configured to be performed using less memory resources than said performing a second graphics operation.

* * * * *